US012783449B2

(12) United States Patent
Huang et al.

(10) Patent No.: US 12,783,449 B2
(45) Date of Patent: Nov. 3, 2026

(54) SYSTEM AND METHOD FOR REALIZING REMOTE CONNECTION OF UAC AND UVC DEVICES VIA WIRELESS CHANNELS

(71) Applicant: SHEN ZHEN PROITAV TECHNOLOGY CO. LTD., Shenzhen (CN)

(72) Inventors: Xiongfei Huang, Shenzhen (CN); Jinian Liu, Shenzhen (CN); Zhiqiang Liu, Shenzhen (CN); Jia Cao, Shenzhen (CN); Junjie Xie, Shenzhen (CN)

(73) Assignee: SHEN ZHEN PROITAV TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 18/729,583

(22) PCT Filed: Nov. 20, 2023

(86) PCT No.: PCT/CN2023/132755
§ 371 (c)(1),
(2) Date: Jul. 17, 2024

(87) PCT Pub. No.: WO2024/114434
PCT Pub. Date: Jun. 6, 2024

(65) Prior Publication Data
US 2026/0161596 A1 Jun. 11, 2026

(30) Foreign Application Priority Data
Nov. 29, 2022 (CN) ......................... 202211503784.0

(51) Int. Cl.
*G06F 13/42* (2006.01)
*G06F 3/14* (2006.01)

(52) U.S. Cl.
CPC ........ *G06F 13/4282* (2013.01); *G06F 3/1454* (2013.01)

(58) Field of Classification Search
CPC ........................... G06F 13/4282; G06F 3/1454
See application file for complete search history.

(56) References Cited

U.S. PATENT DOCUMENTS 9,071,866 B2 * 6/2015 Mason .................... H04B 1/02
2005/0168658 A1 8/2005 Woolgar et al.
(Continued)

FOREIGN PATENT DOCUMENTS

CN 101620522 A 1/2010
CN 111316224 A 6/2020
(Continued)

OTHER PUBLICATIONS

International Search Report for International Application No. PCT/CN2023/132755; Mailing Date, Feb. 19, 2024.
(Continued)

*Primary Examiner* — Phong H Dang
(74) *Attorney, Agent, or Firm* — CANTOR COLBURN LLP

(57) ABSTRACT

This application provides a system and a method for realizing a remote connection of UAC and UVC devices via wireless channels. The system consists of a screen projector Dongle and a receiver RX. The screen projector Dongle includes a Dongle signaling module, a Dongle screen-projection sending module and a USB composite device. The receiver RX is configured to provide externally a USB interface, a HDMI output and a WIFI hardware interface. The receiver RX includes an RX signaling module, an RX screen-projection receiving module and a USB control function module. The method includes an establishment of a signaling channel, a USB connection, establishments of a
(Continued)

USB control and media channels, a cycling of data sending and receiving, a USB change notification, a USB disconnection, a shutdown of the USB control and media channels, and a shutdown of the signaling channel.

10 Claims, 4 Drawing Sheets

(56) References Cited

U.S. PATENT DOCUMENTS

| | | | | | |
|---|---|---|---|---|---|
| 2012/0311207 | A1* | 12/2012 | Powers | G06F 13/385 | |
| | | | | 710/106 | |
| 2015/0249804 | A1* | 9/2015 | Kasahara | G09G 5/006 | |
| | | | | 345/205 | |
| 2017/0293347 | A1 | 10/2017 | Wood, III et al. | | |
| 2020/0272404 | A1* | 8/2020 | Mu | G06F 3/1454 | |
| 2022/0100685 | A1* | 3/2022 | Lee | G06F 13/20 | |
| 2022/0394211 | A1* | 12/2022 | Yang | H04N 21/64 | |

FOREIGN PATENT DOCUMENTS

| | | | |
|---|---|---|---|
| CN | 113257289 | A | 8/2021 |
| CN | 113365118 | A | 9/2021 |
| CN | 115543250 | A | 12/2022 |

OTHER PUBLICATIONS

Written Opinion for International Application No. PCT/CN2023/132755; Mailing Date, Feb. 19, 2024.

* cited by examiner

SYSTEM AND METHOD FOR REALIZING REMOTE CONNECTION OF UAC AND UVC DEVICES VIA WIRELESS CHANNELS

CROSS-REFERENCE TO THE RELATED APPLICATIONS

This application is the national phase entry of International Application No. PCT/CN2023/132755, filed on Nov. 20, 2023, which is based upon and claims priority to the Chinese Patent Application No. 202211503784.0, filed on Nov. 29, 2022, the entire contents each of which are incorporated herein by reference.

TECHNICAL FIELD

The present application relates to the field of wireless communication technology, and more particularly, to a system and a method for realizing a remote connection of UAC (USB Audio Class) and UVC (USB Video Class) devices via wireless channels.

BACKGROUND

The USB-C (USB Type-C) Dongle, when connected to a PC (Personal Computer), enables video and audio information displayed by the PC to be sent to a remote receiver RX via wireless channels, and the RX converts the video and audio information into HDMI (High-Definition Multimedia Interface) and outputs the same to a TV display. When a video conference with remote UAC and UVC devices needs to be hold while projecting the screen of the PC, an additional USB (Universal Serial Bus) cable is required for the PC to connect the UAC and UVC via the RX.

As shown in FIG. 3, an original system for remote connection of the UAC and UVC devices consists of a screen projector Dongle and a receiver RX.

The screen projector Dongle is used to provide externally a USB-C interface, a screen projection button and a WIFI hardware interface. Among them, the USB-C interface is used for the PC to supply power the Dongle, and for the PC to send audio and video data to the Dongle and to construct a touch screen HID (Human Interface Device) USB device. The screen projection button is used to provide functions such as providing a screen projection, canceling the screen projection and freezing the screen projection. The WIFI hardware interface works in WIFI STA (WIFI Station) mode and actively connects to RX. The wireless channels carry signaling and screen projection media. The screen projector Dongle mainly includes a signaling module and a screen-projection sending module. The signaling module is responsible for establishing and maintaining a signaling channel with the receiver RX, and is responsible for signaling processing between the screen projector Dongle and the receiver RX. The screen-projection sending module is used to encode the audio and video data received from the PC through the USB-C interface and send the encoded audio and video data to the receiver RX via a screen-projection media channel on the wireless channels, receive HID device information of the receiver RX via the screen-projection media channel to create a HID device, and receive a HID message and sent the same to PC through USB-C interface.

The receiver RX is used to provide externally a USB device interface, a USB Host interface, a HDMI output and a WIFI hardware interface. Among them, the USB device interface is used to realize the access of UAC, UVC, HID or other devices. The USB Host interface connects the PC to communicate with USB devices through USB HUB. The HDMI output realizes an output of HDMI for the screen-projection. The WIFI hardware interface works in WIFI AP (WIFI Access Point) mode, accepts and manages connections of the screen projector Dongle. The receiver RX mainly includes a signaling module and a function module for receiving the screen-projection. The signaling module is responsible for managing the signaling channel established by the screen projector Dongle, and is responsible for signaling processing between the screen projector Dongle and the receiver RX. The function module for receiving the screen-projection is used to receive audio data encoded by the screen projector Dongle of the screen-projection media channel on the wireless channels, parse and convert the encoded audio data into the HDMI output, manage the HID device, send the HID device information and the HID message to the screen-projection media channel. The main signaling process of the screen projection is shown in FIG. 4.

The disadvantages of the above technology are that: the use of USB cable has a limitation on length, while the wireless transmission does not have, the wireless transmission can cover various large, medium or small conference rooms, and the layout of the conference room is flexible and convenient; and when a user of the PC need to open a video conference room while projecting the screen, the access of the Dongle devices and USB cables is required, this is not as good as the experience of plugging one device into the PC to complete such function.

In view of the above, there is a need to further improve and innovate the existing technologies.

SUMMARY

In view of the technical problems existing in the above-mentioned background technology, the present application provides a system and a method for realizing a remote connection of UAC and UVC devices via wireless channels, the idea here is reasonable, and can achieve a convenient and flexible networking in large, medium and small conference room scenarios. The video conference can be hold under the screen projection by simply plugging the screen projector Dongle into the PC by a user, which thus simplifies user wiring operations and improves the user's experience.

To solve the above technical problems, the present application provides a system for a remote connection of UAC and UVC devices via wireless channels, which consists of a screen projector Dongle and a receiver RX.

The screen projector Dongle is configured to provide externally a USB-C interface, a screen projection button and a WIFI hardware interface. The USB-C interface is configured for a PC to supply power to the screen projector Dongle and for the PC to send audio and video data to the screen projector Dongle. The WIFI hardware interface works in a WIFI STA mode and actively connects to the receiver RX. A wireless channel of the WIFI hardware interface carries signaling and screen projection media.

The screen projector Dongle mainly includes a Dongle signaling module and a Dongle screen-projection sending module. The Dongle signaling module is responsible for establishing and maintaining a signaling channel with the receiver RX, and is responsible for signaling processing between the screen projector Dongle and the receiver RX. The Dongle screen-projection sending module is configured to encode audio and video data received from the PC through the USB-C interface and send the encoded audio and video data to the receiver RX via a screen-projection media channel on the wireless channel, receive HID device information of the receiver RX via the screen-projection media channel to establish a HID device, and send the received HID message to the PC through the USB-C interface.

The receiver RX is configured to provide externally a USB interface, a HDMI output interface and a WIFI hardware interface. The receiver RX includes an RX signaling module and an RX screen-projection receiving module. The RX signaling module is responsible for managing the signaling channel established by the screen projector Dongle, and is responsible for the signaling processing between the receiver RX and the screen projector Dongle. The RX screen-projection receiving module is configured to receive Dongle-encoded audio data from the screen-projection media channel on the wireless channel, parse and convert the Dongle-encoded audio data into a HDMI output and manage the HID device, and send the HID device information and the HID message to the screen-projection media channel The USB-C interface is also configured to present a USB composite device to the PC. The wireless channel of the WIFI hardware interface also carries USB control, Camera media, Speaker media and MIC media channels.

The screen projector Dongle is also configured to provide externally a connection button hardware interface. The connection button hardware interface has a function of realizing a preemptible USB connection and a fallback disconnection.

The screen projector Dongle also includes a USB composite device. The receiver RX also includes a USB control function module. The USB composite device is configured to request a USB composite device descriptor from the receiver RX through signaling control to create a composite device, and establish a transmission channel between the USB composite device and the USB control function module. The transmission channel is configured for the transmission of USB control and USB media information and includes a USB control channel and USB media channel. The USB media channel includes the Camera media, Speaker media and MIC media channels. The USB control function module is configured to complete a management of a USB device connected to the receiver RX, negotiate with a designated screen projector Dongle to provide the USB composite device descriptor, and establish control and media channels with the screen projector Dongle for sending and receiving the USB control and media information.

A method for realizing a remote connection of UAC and UVC devices via wireless channels is provided, which is based on the above system for realizing the remote connection of the UAC and UVC devices via the wireless channels, the method mainly includes the following steps:

(1) establishing the signaling channel;

(2) USB connection (2.1) pressing a connection button of the screen projector Dongle when the screen projector Dongle is in a disconnected state; where the screen projector Dongle without the connection button can be triggered by plugging the screen projector Dongle into the PC;

(2.2) sending, by the screen projector Dongle, a request for USB connection to the receiver RX, where the request comprises a maximum number of endpoints supported by USB, a range of ports available for media reception, a maximum bandwidth supported by WIFI, etc.;

(2.3) performing, by the receiver RX when receiving a request for USB connection, a preemptible connection processing; and (2.4) determining that the USB connection is successful requested if a response code is successfully received when a response to the request for USB connection is received by the screen projector Dongle;

(3) establishing a USB control and media channels;

(4) cycling of data sending and receiving (4.1) reading, by the screen projector Dongle, control information from 0 endpoint of the USB composite device, encapsulating the control information into a control message and sending the same to the receiver RX, and parsing the control message after being received by the receiver RX, and sending the same to a corresponding UAC or UVC device, and feeding back an operation result to the screen projector Dongle, where a USB control channel between the screen projector Dongle and the receiver RX is bidirectional;

(4.2) turning on a MIC, a Speaker and a Camera through the USB control channel;

(4.3) cyclically sending and receiving data from the MIC, the Speaker and the Camera;

(4.4) controlling operations via the USB control channel; and (4.5) shutting down the MIC, the Speaker and the Camera via the USB control channel;

(5) USB change notification (5.1) sending a USB change notification to the screen projector Dongle when the request for USB connection is preempted, a request for USB disconnection is rolled back, and a USB update of the receiver RX is performed, where the USB change notification comprises a message type, a USB composite device descriptor, a number of endpoints configured and an array of endpoint information; a change type comprises a connection, a disconnection and an update of connection;

(5.2) processing, by the screen projector Dongle after receiving the USB change notification from the receiver RX, the USB composite device according to the change type, and sending a response to the receiver RX; and (5.3) processing by the receiver RX, after a response to the USB change notification from the screen projector Dongle is received by the receiver RX and a return code is successfully received, a reading from USB endpoints and a channel for media transceiving according to the change type;

(6) USB disconnection (6.1) pressing the connection button of the screen projector Dongle when the screen projector Dongle is in a connected state, where the screen projector Dongle without the connection button can be triggered by removing the screen projector Dongle from the PC; and performing by the receiver RX a rollback disconnection processing when the signaling channel is shut down, and then releasing the USB control and media channel resources related to the screen projector Dongle;

(6.2) sending, by the screen projector Dongle, the request for USB disconnection to the receiver RX;

(6.3) performing, by the receiver RX upon receiving the request for USB disconnection, a rollback disconnection processing; and (6.4) determining that the USB disconnection is successfully requested if the return code is successfully received when a response to the request for USB disconnection from the receiver RX is received by the screen projector Dongle;

(7) shutting down the USB control and the media channels; and (8) shutting down the signaling channel.

In the method for realizing the remote connection of the UAC and UVC devices via the wireless channels, the specific steps of step (2.3) are as follows:

(2.3.1) turning on, in case that the receiver RX is not connected to the screen projector Dongle, the UAC, UVC and HID devices connected to the USB interface, generating a response to the request for USB connection based on information of the request and sending the response to the screen projector Dongle, where the response to the request for USB connection contains the response code, the USB composite device descriptor, the number of endpoints configured and the array of endpoint information, the endpoint information comprises an endpoint serial number, a type and a receiving port, and the type comprises the USB control, MIC data, Speaker data and Camera data; and establishing corresponding endpoints for reading and writing of the MIC data, the Speaker data, and the Camera data and corresponding channels for media transceiving; and (2.3.2) returning, in case that the receiver RX is connected to the screen projector Dongle, a failure if the receiver RX is not a preemption strategy; and performing the following steps if the receiver RX is the preemption strategy: sending a change notification to a USB-connected screen projector Dongle and shutting down the USB composite device; shutting down, by the receiver RX upon receiving a response to the change notification from the screen projector Dongle, the USB control and data receiving and sending via the USB media channel; generating a request response based on information of the request for USB connection initiated by a new screen projector Dongle and sending the request response to the new screen projector Dongle that is connected; and establishing a channel for media transceiving by the receiver RX for the new screen projector Dongle.

In the method for realizing the remote connection of the UAC and UVC devices via the wireless channels, the specific steps of step (4.3) are as follows:

(4.3.1) reading, by the receiver RX, the MIC data from an endpoint corresponding to a MIC, encapsulating the MIC data into an RTP packet, and sending the RTP packet via a MIC data channel to the screen projector Dongle; and receiving, by the screen projector Dongle, the RTP packet, parsing the RTP packet and writing the same into the USB composite device from the endpoint corresponding to the MIC;

(4.3.2) reading, by the receiver RX, the Camera data from an endpoint corresponding to a Camera, encapsulating the Camera data into an RTP packet, and sending the RTP packet to the screen projector Dongle via a Camera data channel; and receiving, by the screen projector Dongle, the RTP packet, parsing the RTP packet and writing the same into the USB composite device from the endpoint corresponding to the Camera;

(4.3.3) sorting firstly the RTP packets of the MIC data and Camera data received via the media channels by the screen projector Dongle according to a RTP serial number, then sending the RTP packets after being aligned by a RTP timestamp to corresponding endpoints of the USB composite device; and (4.3.4) reading, by the screen projector Dongle, the Speaker data from an endpoint corresponding to a Speaker, encapsulating the Speaker data into an RTP packet, and sending the RTP packet to the receiver RX via a Speaker data channel; and receiving, by the receiver RX, the RTP packet, parsing the RTP packet and writing the same into the endpoint corresponding to the Speaker.

In the method for realizing the remote connection of the UAC and UVC devices via the wireless channels, the specific steps of step (6.3) are as follows:

(6.3.1) shutting down, in case that no screen projector Dongle is connected, the corresponding endpoints for reading and writing of the MIC data, the Speaker data and the Camera data of the UAC and UVC devices and the corresponding channels for media transceiving, shutting down the UAC, UVC and HID devices and sending the response to the request for USB disconnection to the screen projector Dongle; and (6.3.2) shutting down, in case that the screen projector Dongle is connected, channels for media transceiving, sending the response to the request for USB disconnection to a requested screen projector Dongle; sending the USB change notification to a previous USB-connected screen projector Dongle to turn on the USB composite device, and establishing, after receiving the response, the channels for media transceiving.

In the method for realizing the remote connection of the UAC and UVC devices via the wireless channels, the step (1) specifically includes the following steps:

(1.1) using, by the screen projector Dongle a SSID (Service Set Identifier) and a password to connect to the WIFI of the receiver RX, where the SSID and password are obtained by pairing with the receiver RX;

(1.2) using, by the screen projector Dongle, a specified IP (Internet Protocol) and a specified PORT (port) to establish a TCP (Transmission Control Protocol) connection with the receiver RX;

(1.3) sending, by the screen projector Dongle a request for establishing the signaling channel to the receiver RX, where the request contains a device type and access code information;

(1.4) sending, by the receiver RX after receiving the request for processing, a response to the request for establishing the signaling channel to the screen projector Dongle, and the response to the request contains the response code, a client unique identifier, an access code type, an RX device type and a capability set; and (1.5) determining that the signaling channel is established successfully if the response code is successfully received when the response to the request for establishing the signaling channel is received by the screen projector Dongle.

In the method for realizing the remote connection of the UAC and UVC devices via the wireless channels, the step (3) specifically includes steps of: creating, by the screen projector Dongle, the USB composite device according to the USB composite device descriptor in the response to the request for USB connection; and establishing, based on the array of endpoint information, the corresponding endpoints for reading and writing of the USB composite device and the corresponding channels for media transceiving.

In the method for realizing the remote connection of the UAC and UVC devices via the wireless channels, control operation steps of step (4.4) are as follows:

(4.4.1) muting or unmuting a MIC and a Speaker;

(4.4.2) adding or subtracting a volume of the MIC and the Speaker;

(4.4.3) performing a moving or a zooming on a Camera; and (4.4.4) adjusting a contrast and a brightness of the Camera.

In the method for realizing the remote connection of the UAC and UVC devices via the wireless channels, the step (7) specifically includes a step of: shutting down, by the screen projector Dongle, the USB media channel, the USB control channel and the USB composite device.

In the method for realizing the remote connection of the UAC and UVC devices via the wireless channels, the step (8) specifically includes a step of: shutting down the signaling channel when the screen projector Dongle has neither the screen projector Dongle nor USB composite device.

The present application has the following beneficial effects with the above technical schemes:

The system and method for realizing the remote connection of the UAC and UVC devices via the wireless channels in the present application have reasonable concepts and can achieve a convenient and flexible networking in large, medium and small conference room scenarios. Users only need to plug the screen projector Dongle into the PC to project the screen and hold the video conference, which simplifies user wiring operations and improves the users' experience. The present application supports the simultaneous plugging of Dongles into multiple PCs, and the USB hosts can be flexibly switched according to the user's connection commands, which, after disconnecting, can automatically fall back to the previous USB host.

BRIEF DESCRIPTION OF THE DRAWINGS

In order to illustrate solutions in the embodiments of the present application more clearly, the following will briefly introduce the drawings that need to be used in description of the embodiments. Obviously, the drawings in the following description are merely some embodiments of the present application. For those of ordinary skill in the art, other drawings may also be obtained according to these drawings without exerting creative efforts.

DETAILED DESCRIPTION OF THE EMBODIMENTS

The technical schemes of the present application will be clearly and completely described below with reference to the accompanying drawings. Obviously, the described embodiments are part of the embodiments of the present application, rather than all of the embodiments. Based on the embodiments in the present application, all other embodiments obtained by those of ordinary skill in the art without exerting creative efforts fall within the protection scope of the present application.

The present application will be further explained below in conjunction with specific embodiments.

Glossary

PC stands for Personal Computer, that is, personal computer;

USB stands for Universal Serial Bus, that is, universal serial bus;

UAC stands for USB Audio Class, that is, USB audio class;

UVC stands for USB Video Class, that is, USB video class;

USB-C stands for USB Type-C;

HID stands for Human Interface Device, that is, human-computer interaction device;

Camera, that is, camera;

Speaker, that is, speaker;

MIC stands for Microphone, that is, microphone;

WIFI AP stands for WIFI Access Point, that is: WIFI access point; and

WIFI STA stands for WIFI Station, that is, WIFI client.

Figure 1:
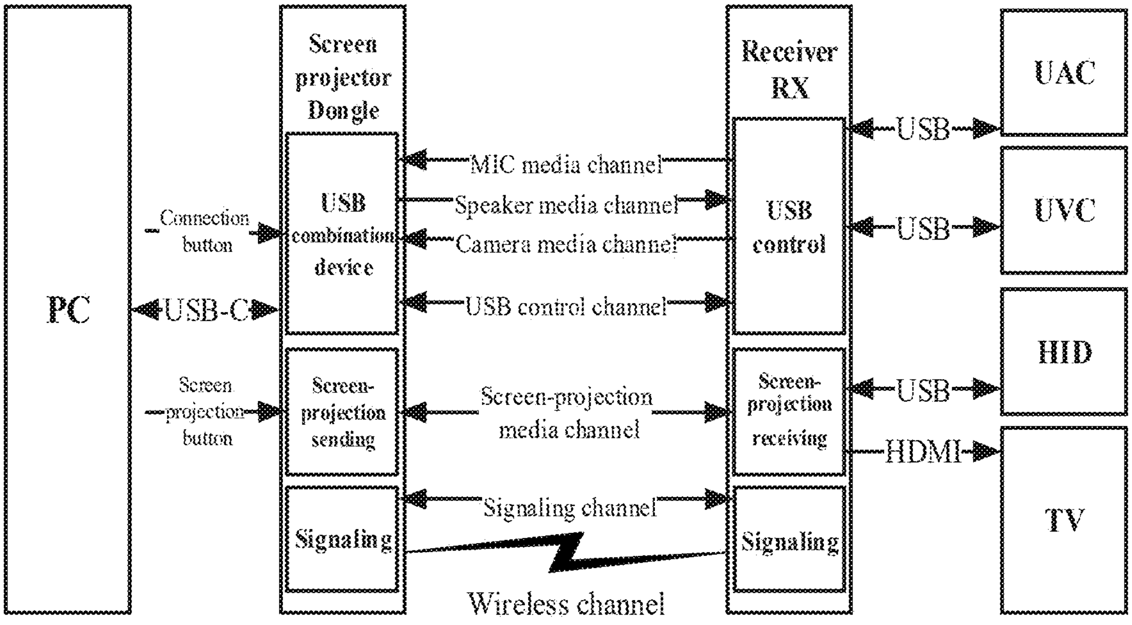
FIG. 1 is a structural diagram of a system for realizing a remote connection of UAC and UVC devices via wireless channels in accordance with the present application.

As shown in FIG. 1, a system for remote connection of UAC and UVC devices is realized via wireless channels in the present application, the system consists of a screen projector Dongle and a receiver RX.

The screen projector Dongle is configured to provide externally a USB-C interface, a screen projection button, a WIFI hardware interface and a connection button hardware interface. Among them, the USB-C interface is configured for the PC to supply power to the screen projector Dongle, for the PC to send audio and video data to the screen projector Dongle, and to present a USB composite device to the PC. The screen projection button has functions such as providing the screen projection, canceling the screen projection, and freezing the screen projection, etc. The WIFI hardware interface works in WIFI STA mode and actively connects to the receiver RX. The wireless channel of the WIFI hardware interface carries channels for signaling, screen projection media, USB control, Camera media, Speaker media and MIC media. The connection button hardware interface has a function of realizing a preemptible USB connection and a fallback disconnection. The USB connection can be triggered by inserting the screen projector Dongle, and the USB reversible disconnect function can be triggered by detecting an offline of the USB connection screen projector Dongle through the receiver RX.

The screen projector Dongle mainly includes a Dongle signaling module, a Dongle screen-projection sending module and the USB composite device. Among them, the Dongle signaling module is responsible for establishing and maintaining a signaling channel with the receiver RX, and is responsible for signaling processing between the screen projector Dongle and the receiver RX. The Dongle screen-projection sending module is configured to encode the audio and video data received from the PC through the USB-C interface, send the encoded audio and video data to the receiver RX via a screen-projection media channel on the wireless channel, receive HID device information of the receiver RX via the screen-projection media channel to create a HID device, and receive a HID message and send the same to the PC through the USB-C interface. The USB composite device is configured to request a USB composite device descriptor from the receiver RX through a signaling control to build a composite device and establish a transmission channel between the USB composite device and the USB control function module of the receiver RX. The transmission channel is configured to transmit a USB control and USB media information, the transmission channel contains a USB control channel and a USB media channel, and the USB media channel includes a camera media channel, a speaker media channel and a MIC media channel.

The receiver RX is configured to provide externally a USB interface, a HDMI output interface and a WIFI hardware interface. Among them, the USB interface is configured to enable the accesses of UAC, UVC, HID and other devices. The HDMI output interface is configured to enable an output of HDMI for screen projection. The WIFI hardware interface works in a WIFI AP mode and is configured to accept and manage a connection of the screen projector Dongle.

The receiver RX mainly includes an RX signaling module, an RX screen-projection receiving module and a USB control function module. Among them, the RX signaling module is responsible for managing the signaling channel established by the screen projector Dongle, and is responsible for signaling processing between the receiver RX and the screen projector Dongle. The RX screen-projection receiving module is configured to receive Dongle-encoded audio data via the screen-projection media channel on the wireless channel, parse and convert the Dongle-encoded audio data into a HDMI output, manage the HID device, and send the HID device information and the HID message to the screen-projection media channel. The USB control function module is configured to complete a management of the USB device(s) connected to the receiver RX, negotiate with a designated screen projector Dongle to provide the USB composite device descriptor, and establish control and media channels with the screen projector Dongle for sending and receiving the USB control and media information.

Figure 2:
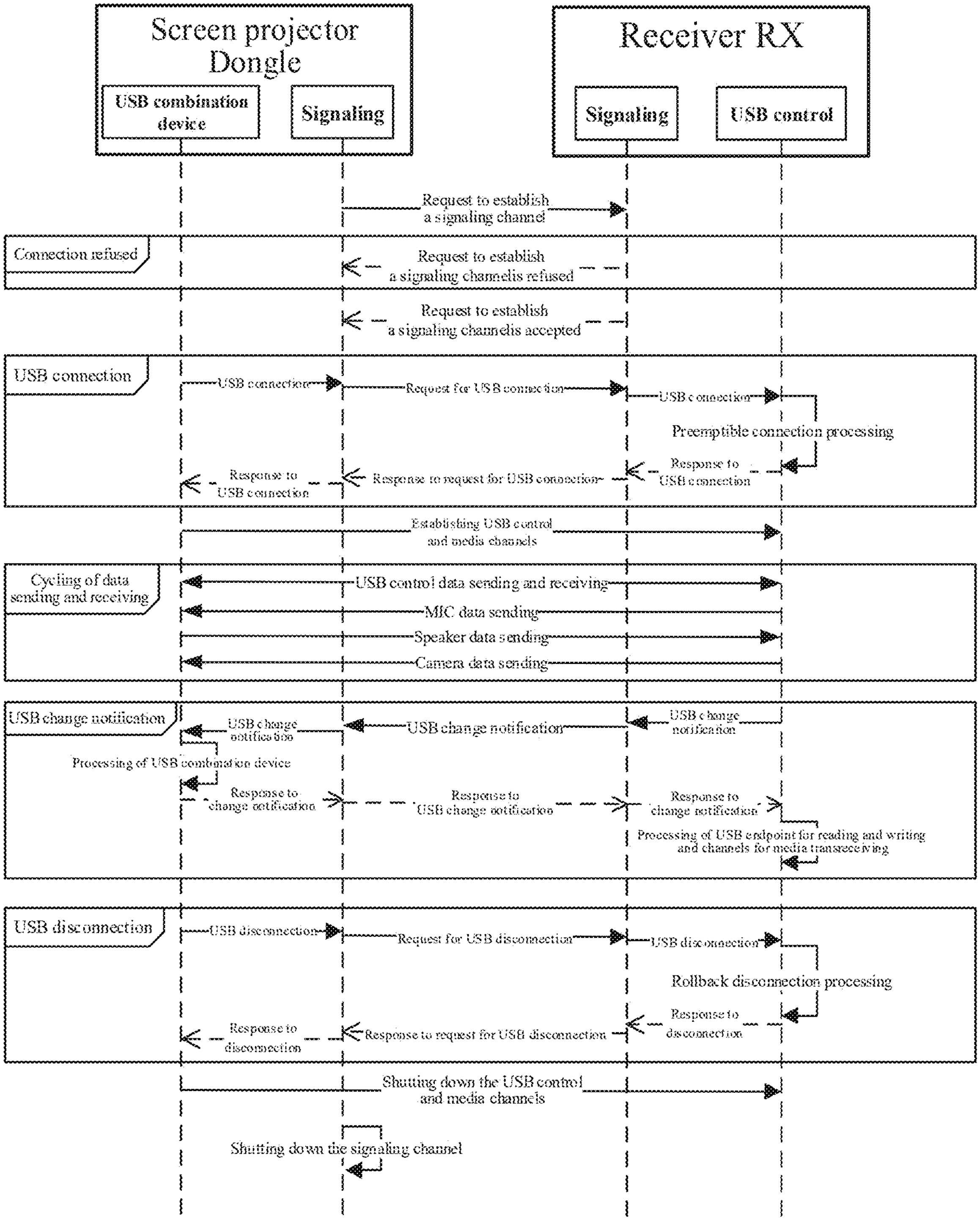
FIG. 2 is a flow chart of a method of realizing remote connection of UAC and UVC devices via wireless channels in accordance with the present application.
Figure 3:
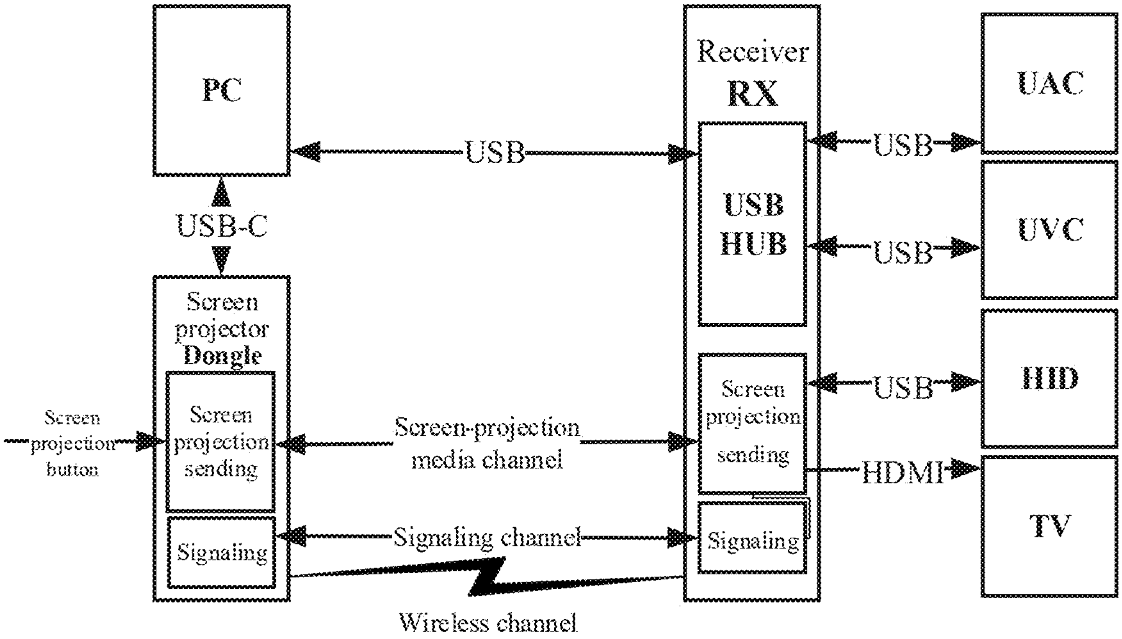
Prior Art FIG. 3
FIG. 3 is a structural diagram of an original system for remote connection of UAC and UVC devices.
Figure 4:
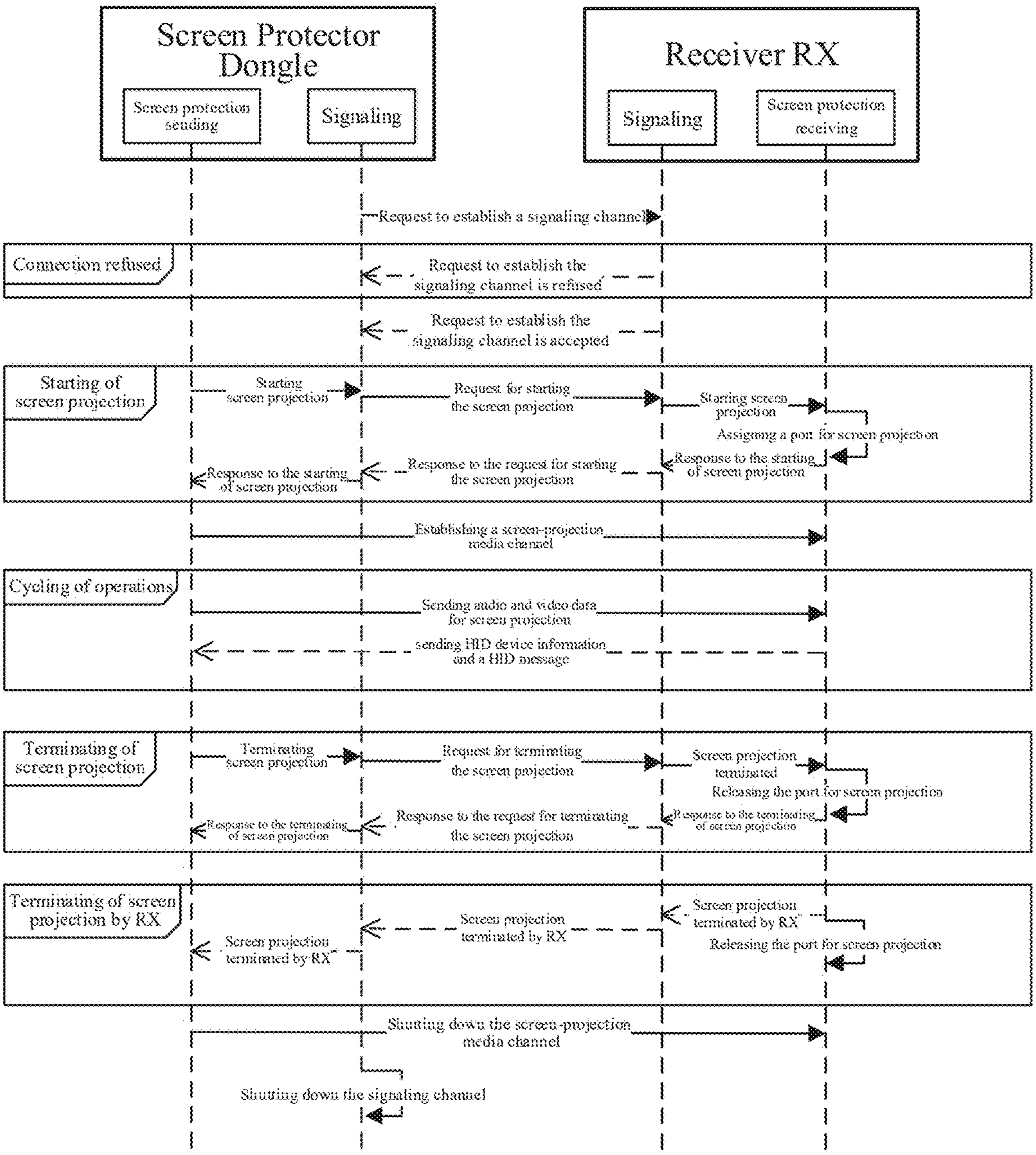
Prior Art FIG. 4
FIG. 4 is a flow chart of an original method for remote connection of UAC and UVC devices.

As shown in FIG. 2, the method for remote connection of UAC and UVC devices is realized via wireless channels in the present application, the method is based on the above-mentioned system for realizing the remote connection of the UAC and UVC devices via the wireless channels, and particularly includes the following steps:

Step S100, establishing of a signaling channel:

In step S110, the screen projector Dongle, by using a SSID (Service Set Identifier) and a password, is connected to the WIFI of a receiver RX. The SSID and password are obtained by pairing with the receiver RX.

In step S120, the screen projector Dongle, by using a specified IP (Internet Protocol) and PORT, establishes a TCP (Transmission Control Protocol) connection with the receiver RX.

In step S130, a request to establish the signaling channel is sent by the screen projector Dongle to the receiver RX. The request includes a device type and access code information.

In step S140, the receiver RX, after receiving the request for processing, sends a response to the request to establish the signaling channel to the screen projector Dongle. The response to the request includes a response code, a client unique identifier, an access code type, an RX device type and a capability set.

In step S150, the response to the request to establish the signaling channel is received by the screen projector Dongle, if the response code is successfully received, then it is indicated that the signaling channel is created successfully.

Step S200, USB connection:

In step S210, a connection button of the screen projector Dongle is pressed when the screen projector Dongle is in a disconnected state. The screen projector Dongle without a connection button can be triggered by plugging the screen projector Dongle into a PC.

In step S220, a request for USB connection is sent by the screen projector Dongle to the receiver RX. The request for USB connection includes the maximum number of endpoints supported by USB, the range of ports available for media reception, the maximum bandwidth supported by WIFI, etc.

In step S230, a preemptible connection processing is performed by the receiver RX when receiving the request for USB connection.

In step S231, in a case where the receiver RX is not connected to the screen projector Dongle: the UAC, UVC and HID devices connected to the USB interface are turned on, a response to the request for USB connection is generated based on the request information and sent to the screen projector Dongle. The response to the request for USB connection contains the response code, the USB composite device descriptor, the number of endpoints configured, and an array of endpoint information (the endpoint information includes an endpoint serial number, a type, a receiving port, the type includes a USB control, MIC data, Speaker data and Camera data). Corresponding endpoints for reading and writing of MIC data, Speaker data and Camera data of UAC and UVC devices as well as the corresponding channels for media transceiving are established.

In step S232, in a case where the receiver RX is connected to the screen projector Dongle: if the receiver RX is not a preemption strategy, a failure will be returned, and if the receiver RX is the preemption strategy, then a change notification is sent to the USB-connected screen projector Dongle, and the USB composite device is shut down. After a response to the change notification from the screen projector Dongle is received by the receiver RX, the USB control and the data receiving and sending of the USB media channel are shut down; a response to the request for USB connection is generated by the receiver RX based on the information of the request for USB connection initiated by a new screen projector Dongle and sent by the receiver RX to the newly-connected screen projector Dongle, and then a channel for media transceiving is created by the receiver RX for the new screen projector Dongle.

In step S240, the response to the request for USB connection is received by the screen projector Dongle, if the response code is successfully received, then it is indicated that the USB connection is successfully requested.

Step S300, establishing of the USB control and media channels:

The USB composite device is created by the screen projector Dongle based on the USB composite device descriptor in the response to the request for USB connection, the corresponding endpoints for reading and writing of the USB composite device as well as the corresponding channels for media transceiving of the USB combined device are established based on the array of endpoint information.

Step S400, cycling of data sending and receiving:

In step S410, the USB control channel between the screen projector Dongle and the receiver RX is bidirectional. The screen projector Dongle reads control information from the USB composite device at 0 endpoint, encapsulates the control information into a control message and sends the same to the receiver RX. The receiver RX, after receiving and parsing the control message, send the parsed control message to the corresponding UAC or UVC device, and returns an operation result to the screen projector Dongle.

In step S420, the MIC, Speaker and Camera are turned on via the USB control channel;

In step S430, the MIC data, Speaker data and Camera data are sent and received cyclically.

In step S431, the receiver RX reads the MIC data from an endpoint corresponding to a MIC, encapsulates the MIC data into an RTP packet, and sends the RTP packet to the screen projector Dongle via a channel for the MIC data. The RTP packet, after being received and parsed by the screen projector Dongle, is written by the screen projector Dongle into the USB composite device from the endpoint corresponding to the MIC.

In step S432, the receiver RX reads the Camera data from an endpoint corresponding to a Camera, encapsulates the Camera data into an RTP packet, and sends the RTP packet to the screen projector Dongle via a channel for the Camera data. The RTP packet, after being received and parsed by the screen projector Dongle, is written by the screen projector Dongle into the USB composite device from the endpoint corresponding to the Camera.

In step S433, the RTP packets of the MIC and Camera, after being received by the screen projector Dongle via the media channels, is firstly sorted by a RTP serial number, then, aligned by RTP timestamp, and then sent to the corresponding endpoint of the USB composite device.

In step S434, the screen projector Dongle reads the Speaker data from an endpoint corresponding to a Speaker data, encapsulates the Speaker data into an RTP packet, and sends the RTP packet to the receiver RX via a channel for the Speaker data. The RTP packet, after being received and parsed by the receiver RX, is written by the receiver RX into the endpoint corresponding to the Speaker.

In step S440, operations through USB control channel are controlled.

In step S441, MIC and Speaker are muted or mute-canceled;

In step S442, a volume of the MIC or Speaker is added or subtracted.

In step S443, the Camera is moved or zoomed, etc.

In step S444, an adjustment is performed on a contrast, a brightness or other performances of the Camera.

In step S450, MIC, Speaker and Camera are shut down via the USB control channel.

Step S500, USB change notification:

In step S510, a USB change notification is sent to the screen projector Dongle when the request for USB connection is preempted, a request for USB disconnection is rolled back, and a USB update of the receiver RX is performed. The notification of change includes the message type, the USB composite device descriptor, and the number of endpoints configured, and the array of endpoint information. The type of change includes a connection, a disconnection and an update of connection.

In step S520, the screen projector Dongle, after receiving the USB change notification from the receiver RX, processes the USB composite device according to the change type, and sends a response to the receiver RX.

In step S530, the receiver RX, after receiving the response to the USB change notification from the screen projector Dongle and returning a code successfully, processes a reading from the USB endpoint and a channel for media transceiving according to the change type.

Step S600, USB disconnection:

In step S610, a connection button of the screen projector Dongle is pressed when the screen projector Dongle is in a connected state. The screen projector Dongle without a connection button can be triggered by being removed from the PC, and the receiver RX performs a rollback disconnection processing when the signaling channel is shut down and then release the USB control and media channel resources related to the screen projector Dongle.

In step S620, a request for USB disconnection is sent by the screen projector Dongle to the receiver RX.

In step S630, the receiver RX, when receiving the request for USB disconnection, performs the rollback disconnection processing.

In step S631, when no screen projector Dongle is connected, the corresponding endpoints for reading and writing of MIC data, Speaker data, and Camera data of the UAC and UVC devices and the corresponding channels for media transceiving are cut off, the UAC, UVC, and HID devices are shut down, and the response to the request for USB disconnection is sent to the screen projector Dongle.

In step S632, when the screen projector Dongle is connected, the channels for media transceiving are cut off, the response to the request for USB disconnection is sent to the requested screen projector Dongle, a USB change notification is sent to the previous USB connected screen projector Dongle to turn on the USB composite device, and a channel for media transceiving is established after the respond is received.

In step S640, the response to the request for USB disconnection from the receiver RX is received by the screen projector Dongle, if the return code is successfully received, then it is indicated that the USB disconnection is successfully requested.

In step S700, the USB control and media channels are shut down.

The USB media channel, the USB control channel and the USB composite device are shut down.

In step S800, the signaling channel is shut down.

The signaling channel is shut down when the screen projector Dongle has neither screen projection nor USB composite device.

The invention idea of the present application is reasonable and can be used for convenient and flexible networking in large, medium and small conference room scenarios. Users only need to plug the screen projector Dongle into the PC to project the screen and hold the video conference, this simplifies user wiring operations and improves the users' experience, which thus is suitable for promotion and application.

Finally, it should be noted that the above embodiments are only used to illustrate the technical schemes of the present application, and are not intended to limit the present application. Although the present application has been described in detail with reference to the foregoing embodiments, it should be understood for those of ordinary skills in the art that the technical schemes described in the above embodiments may be modified, or some technical features in the above embodiments may be equivalently substituted, and these modifications or substitutions do not deviate the essence of the corresponding technical schemes from the scope of technical schemes of various embodiments of the present application.

The invention claimed is:

1. A system for realizing a remote connection of UAC (universal serial bus audio class, USB audio class) and UVC (universal serial bus video class, USB video class) devices via wireless channels, consisting of a screen projector Dongle and a receiver RX;

wherein the screen projector Dongle is configured to provide externally a USB-C (universal serial bus type-c) interface, a screen projection button and a WIFI hardware interface; the USB-C interface is configured for a PC (personal computer) to supply power to the screen projector Dongle and for the PC to send audio and video data to the screen projector Dongle; the WIFI hardware interface works in a WIFI STA (WIFI station) mode and actively connects to the receiver RX; a wireless channel of the WIFI hardware interface carries signaling and screen projection media;

the screen projector Dongle comprises a Dongle signaling module and a Dongle screen-projection sending module; the Dongle signaling module is responsible for establishing and maintaining a signaling channel with the receiver RX, and is responsible for signaling processing between the screen projector Dongle and the receiver RX; the Dongle screen-projection sending module is configured to encode the audio and video data received from the PC through the USB-C interface and send encoded audio and video data to the receiver RX via a screen-projection media channel on the wireless channel, receive HID (human interface device) device information of the receiver RX via the screen-projection media channel to create a HID device, and receive a HID message and send the HID message to the PC through the USB-C interface;

the receiver RX is configured to provide externally a USB (universal serial bus) interface, a HDMI (high-definition multimedia interface) output interface and a WIFI hardware interface; the receiver RX comprises an RX signaling module and an RX screen-projection receiving module; the RX signaling module is responsible for managing the signaling channel established by the screen projector Dongle, and is responsible for the signaling processing between the receiver RX and the screen projector Dongle; the RX screen-projection receiving module is configured to receive Dongle-encoded audio data from the screen-projection media channel on the wireless channel, parse and convert the Dongle-encoded audio data into a HDMI output and manage the HID device, and send the HID device information and the HID message to the screen-projection media channel; and wherein the USB-C interface is further configured to present a USB composite device to the PC; the wireless channel of the WIFI hardware interface of the screen projector Dongle further carries a USB control channel, a camera media channel, a speaker media channel and a MIC (microphone) media channel;

the screen projector Dongle is further configured to provide externally a connection button hardware interface; and the connection button hardware interface has a function of realizing a preemptible USB connection and a fallback disconnection;

the screen projector Dongle comprises the USB composite device;

the receiver RX further comprises a USB control function module; the USB composite device is configured to request a USB composite device descriptor from the receiver RX through a signaling control to create a composite device and establish a transmission channel between the USB composite device and the USB control function module; the transmission channel is configured for transmissions of a USB control and USB media information and comprises the USB control channel and a USB media channel; and the USB media channel comprises the camera media channel, the speaker media channel and the MIC media channel; the USB control function module is configured to complete a management of a USB device connected to the receiver RX, negotiate with the screen projector Dongle to provide the USB composite device descriptor, and establish control and media channels with the screen projector Dongle for sending and receiving the USB control and media information.

2. A method for realizing a remote connection of UAC and UVC devices via wireless channels, based on the system for realizing the remote connection of the UAC and UVC devices via the wireless channels according to claim 1, wherein the method comprises the following steps:

(1) establishing the signaling channel;

(2) USB connection, comprising:

(2.1) pressing, if the screen projector Dongle has a connection button, the connection button of the screen projector Dongle when the screen projector Dongle is in a disconnected state; or triggering, if the screen projector Dongle has no connection button, a connection by plugging the screen projector Dongle into the PC;

(2.2) sending, by the screen projector Dongle, a request for USB connection to the receiver RX, wherein the request comprises a maximum number of endpoints supported by USB, a range of ports available for media reception, a maximum bandwidth supported by WIFI;

(2.3) performing, by the receiver RX when receiving a request for USB connection, a preemptible connection processing; and (2.4) determining that the USB connection is successfully requested if a response code is successfully received when a response to the request for USB connection is received by the screen projector Dongle;

(3) establishing a USB control and media channels;

(4) cycling of data sending and receiving, comprising:

(4.1) reading, by the screen projector Dongle, control information from an endpoint of the USB composite device, encapsulating the control information into a control message and sending the same to the receiver RX, and parsing the control message after being received by the receiver RX, and sending the same to a corresponding UAC or UVC device, and feeding back an operation result to the screen projector Dongle, wherein a USB control channel between the screen projector Dongle and the receiver RX is bidirectional;

(4.2) turning on a MIC, a Speaker and a Camera through the USB control channel;

(4.3) cyclically sending and receiving data from the MIC, the Speaker and the Camera;

(4.4) controlling operations via the USB control channel; and (4.5) shutting down the MIC, the Speaker and the Camera via the USB control channel;

(5) USB change notification, comprising:

(5.1) sending a USB change notification to the screen projector Dongle when the request for USB connection is preempted, a request for USB disconnection is rolled back, and a USB update of the receiver RX is performed, wherein the USB change notification comprises a message type, a USB composite device descriptor, and a number of endpoints configured. and an array of endpoint information; the change type comprises a connection, a disconnection and an update of connection;

(5.2) processing, by the screen projector Dongle after receiving the USB change notification from the receiver RX, the USB composite device according to the change type, and sending a response to the receiver RX; and (5.3) processing by the receiver RX, after a response to the USB change notification from the screen projector Dongle is received by the receiver RX and a return code is successfully received, a reading from USB endpoints and a channel for media transceiving according to the change type;

(6) USB disconnection, comprising:

(6.1) pressing the connection button of the screen projector Dongle when the screen projector Dongle is in a connected state, wherein the screen projector Dongle without the connection button can be triggered by removing the screen projector Dongle from the PC; and performing by the receiver RX a rollback disconnection processing when the signaling channel is shut down, and then releasing the USB control and media channel resources related to the screen projector Dongle;

(6.2) sending, by the screen projector Dongle, the request for USB disconnection to the receiver RX;

(6.3) performing, by the receiver RX upon receiving the request for USB disconnection, a rollback disconnection processing; and (6.4) determining that the USB disconnection is successfully requested if the return code is successfully received when a response to the request for USB disconnection from the receiver RX is received by the screen projector Dongle;

(7) shutting down the USB control and the media channels; and (8) shutting down the signaling channel.

3. The method for realizing the remote connection of the UAC and UVC devices via the wireless channels according to claim 2, wherein the step (2.3) further comprises the following steps:

(2.3.1) turning on, in case that the receiver RX is not connected to the screen projector Dongle, the UAC, UVC and HID devices connected to the USB interface, generating a response to the request for USB connection based on information of the request and send the response to the screen projector Dongle. The response to the request for USB connection contains the response code, the USB composite device descriptor, the number of endpoints configured and the array of endpoint information, and the endpoint information comprises an endpoint serial number, a type, and a receiving port, the type comprises the USB control, MIC data, Speaker data, and Camera data; establishing corresponding endpoints for reading and writing of the MIC data, the Speaker data, and the Camera data and corresponding channels for media transceiving;

(2.3.2) returning, in case that the receiver RX is connected to the screen projector Dongle, a failure if the receiver RX is not a preemption strategy; and performing the following steps if the receiver RX is the preemption strategy: sending a change notification to a USB-connected screen projector Dongle and shutting down the USB composite device; shutting down, by the receiver RX upon receiving a response to the change notification from the screen projector Dongle, the USB control and data receiving and sending via the USB media channel; generating a request response based on information of the request for USB connection initiated by a new screen projector Dongle and sending the request response to the new screen projector Dongle that is connected; and establishing a channel for media transceiving by the receiver RX for the new screen projector Dongle.

4. The method for realizing the remote connection of the UAC and UVC devices via the wireless channels according to claim 3, wherein the step (4.3) further comprises the following steps:

(4.3.1) reading, by the receiver RX, the MIC data from an endpoint corresponding to a MIC, encapsulating the MIC data into an RTP packet, and sending the RTP packet via the MIC data channel to the screen projector Dongle; and receiving, by the screen projector Dongle, the RTP packet, parsing the RTP packet and writing the same into the USB composite device from the endpoint corresponding to the MIC;

(4.3.2) reading, by the receiver RX, the Camera data from an endpoint corresponding to a Camera, encapsulating the Camera data into an RTP packet, and sending the RTP packet to the screen projector Dongle via the Camera data channel; and receiving, by the screen projector Dongle, the RTP packet, parsing the RTP packet and writing the same into the USB composite device from the endpoint corresponding to the Camera;

(4.3.3) sorting firstly the RTP packets of the MIC data and Camera data received via the media channels by the screen projector Dongle according to a RTP serial number, then sending the RTP packets after being aligned by a RTP timestamp to corresponding endpoints of the USB composite device;

(4.3.4) reading, by the screen projector Dongle, the Speaker data from an endpoint corresponding to a Speaker, encapsulating the Speaker data into an RTP packet, and sending the RTP packet to the receiver RX via the Speaker data channel; and receiving, by the receiver RX, the RTP packet, parsing the RTP packet and writing the same into the endpoint corresponding to the Speaker.

5. The method for realizing the remote connection of the UAC and UVC devices via the wireless channels according to claim 3, wherein the step (6.3) further comprises the following steps:

(6.3.1) shutting down, in case that no screen projector Dongle is connected, the corresponding endpoints for reading and writing of the MIC data, the Speaker data and the Camera data of the UAC and UVC devices and the corresponding channels for media transceiving, shutting down the UAC, UVC and HID devices and sending the response to the request for USB disconnection to the screen projector Dongle; and (6.3.2) shutting down, in case that the screen projector Dongle is connected, channels for media transceiving, sending the response to the request for USB disconnection to a requested screen projector Dongle; sending the USB change notification to a previous USB-connected screen projector Dongle to turn on the USB composite device, and establishing, after receiving the response, the channels for media transceiving.

6. The method for realizing the remote connection of the UAC and UVC devices via the wireless channels according to claim 2, wherein the step (1) further comprises the following steps:

(1.1) using, by the screen projector Dongle a SSID (Service Set Identifier) and a password to connect to the WIFI of the receiver RX, wherein the SSID and password are obtained by pairing with the receiver RX;

(1.2) using, by the screen projector Dongle, a specified IP (Internet Protocol) and a specified PORT (port) to establish a TCP (Transmission Control Protocol) connection with the receiver RX;

(1.3) sending, by the screen projector Dongle, a request for establishing the signaling channel to the receiver RX, wherein the request contains a device type and access code information;

(1.4) sending, by the receiver RX after receiving the request for processing, a response to the request for establishing the signaling channel to the screen projector Dongle, and the response to the request contains the response code, a client unique identifier, an access code type, an RX device type and a capability set; and (1.5) determining that the signaling channel is established successfully if the response code is successfully received when the response to the request for establishing the signaling channel is received by the screen projector Dongle.

7. The method for realizing the remote connection of the UAC and UVC devices via the wireless channels according to claim 2, wherein the step (1) further comprises steps of: creating, by the screen projector Dongle, the USB composite device according to the USB connection device descriptor in the response to the request for USB connection; and establishing, based on the array of endpoint information, the corresponding endpoints for reading and writing of the USB composite device and the corresponding channels for media transceiving.

8. The method for realizing the remote connection of the UAC and UVC devices via the wireless channels according to claim 2, wherein the step (4.4) has the following control operations:

(4.4.1) muting or unmuting a MIC and a Speaker;

(4.4.2) adding or subtracting a volume of the MIC and the Speaker;

(4.4.3) performing a moving or a zooming on a Camera; and (4.4.4) adjusting a contrast and a brightness of the Camera.

9. The method for realizing the remote connection of the UAC and UVC devices via the wireless channels according to claim 2, wherein the step (7) further comprises: shutting down, by the screen projector Dongle, the USB media channel, the USB control channel and the USB composite device.

10. The method for realizing the remote connection of the UAC and UVC devices via the wireless channels according to claim 2, wherein the step (8) further comprises: shutting down the signaling channel when the screen projector Dongle has neither the screen projector Dongle nor USB composite device.

* * * * *